US012015230B2

(12) United States Patent
Fröschl

(10) Patent No.: US 12,015,230 B2
(45) Date of Patent: Jun. 18, 2024

(54) ELECTRICAL CONNECTION BETWEEN AN ELECTRICAL CONDUCTOR AND A CONTACT ELEMENT

(71) Applicant: GEBAUER & GRILLER KABELWERKE GESELLSCHAFT M.B.H., Vienna (AT)

(72) Inventor: Karl Fröschl, Herrnbaumgarten (AT)

(73) Assignee: GEBAUER & GRILLER KABELWERKE GESELLSCHAFT M.B.H., Vienna (AT)

( * ) Notice: Subject to any disclaimer, the term of this patent is extended or adjusted under 35 U.S.C. 154(b) by 342 days.

(21) Appl. No.: 17/623,991

(22) PCT Filed: Jul. 1, 2020

(86) PCT No.: PCT/EP2020/068540
§ 371 (c)(1),
(2) Date: Dec. 30, 2021

(87) PCT Pub. No.: WO2021/001434
PCT Pub. Date: Jan. 7, 2021

(65) Prior Publication Data

US 2022/0328985 A1 Oct. 13, 2022

(30) Foreign Application Priority Data

Jul. 3, 2019 (EP) .................................... 19184264

(51) Int. Cl.
*H01R 4/02* (2006.01)
*H01R 4/18* (2006.01)
(Continued)

(52) U.S. Cl.
CPC ......... *H01R 4/187* (2013.01); *H01R 43/0221* (2013.01); *H01R 43/048* (2013.01)

(58) Field of Classification Search
CPC ........ H02R 4/187; H02R 4/029; H02R 4/026; H02R 4/02; H02R 43/0021; H02R 43/0207; H02R 43/0214; H02R 43/048
(Continued)

(56) References Cited

U.S. PATENT DOCUMENTS 4,966,565 A * 10/1990 Dohi ...................... H01R 4/187 29/860
8,759,679 B2 6/2014 Takushi et al.
(Continued)

FOREIGN PATENT DOCUMENTS

CN 102683903 9/2012
CN 103190036 7/2013
(Continued)

OTHER PUBLICATIONS

China Search Report/Office Action conducted in counterpart China Appln. No. 202080048045.X (Sep. 15, 2023).
(Continued)

*Primary Examiner* — Harshad C Patel
(74) *Attorney, Agent, or Firm* — GREENBLUM & BERNSTEIN, P.L.C.

(57) ABSTRACT

A method for producing an electrical connection between an electrical conductor, which includes a plurality of individual wires, and a contact element. The electrical conductor is arranged in a contact portion of the contact element, and the contact portion and the electrical conductor are subsequently pressed together so that the contact portion surrounds the electrical conductor. A plurality of mutually spaced elongate welded connections between the contact portion and the electrical conductor are produced by laser irradiation of the contact portion, or by laser irradiation of the electrical conductor through an opening in the contact portion. The elongate welded connections extend in an irradiation direc-
(Continued)

tion from an irradiated region of the contact portion, or from an irradiated region of the electrical conductor, through an entire cross-section of the pressed electrical conductor to a region of the contact portion opposite to the irradiated region, such that the electrical conductor is connected to this area of the contact portion; and the irradiated regions are arranged in the form of a grid.

21 Claims, 9 Drawing Sheets

(51) Int. Cl.
*H01R 43/02* (2006.01)
*H01R 43/048* (2006.01)

(58) Field of Classification Search
USPC .......................................................... 439/874
See application file for complete search history.

(56) References Cited

U.S. PATENT DOCUMENTS

| | | | | |
|---|---|---|---|---|
| 9,225,076 | B2 | 12/2015 | Froeschl et al. | |
| 9,394,588 | B2 * | 7/2016 | Matsuo | H01R 43/048 |
| 10,283,924 | B2 * | 5/2019 | Bauer | H01R 4/187 |
| 10,833,426 | B2 * | 11/2020 | Hoenle | H01R 4/18 |
| 2004/0142607 | A1 | 7/2004 | Asakura et al. | |
| 2006/0057903 | A1 | 3/2006 | Asakura et al. | |
| 2012/0237787 | A1 | 9/2012 | Takushi et al. | |
| 2013/0203303 | A1 | 8/2013 | Froeschl et al. | |
| 2014/0097002 | A1 | 4/2014 | Sachs et al. | |
| 2014/0144016 | A1 * | 5/2014 | Bauer | B23K 26/21<br>29/863 |
| 2015/0319865 | A1 * | 11/2015 | Sachs | H05K 3/1283<br>427/551 |
| 2015/0325930 | A1 | 11/2015 | Hoenle et al. | |
| 2015/0357725 | A1 | 12/2015 | Matsuo et al. | |
| 2016/0037288 | A1 | 2/2016 | Pai | |
| 2016/0126642 | A1 | 5/2016 | Tonoike et al. | |
| 2016/0372881 | A1 | 12/2016 | Bauer et al. | |

FOREIGN PATENT DOCUMENTS

| | | |
|---|---|---|
| CN | 103201909 | 7/2013 |
| CN | 104704930 | 6/2015 |
| CN | 104823329 | 8/2015 |
| CN | 105556766 | 5/2016 |
| DE | 19749909 | 6/1998 |
| DE | 10 358 153 | 8/2004 |
| DE | 10 2010 035424 | 3/2012 |
| DE | 10 2012 007846 | 10/2013 |
| DE | 10 2013 010981 | 8/2014 |
| EP | 2 830 158 | 1/2015 |

OTHER PUBLICATIONS

Int'l Search Report (Form PCT/ISA/210) conducted in Int'l Application No. PCT/EP2020/068540 (Sep. 23, 2020).
Int'l Written Opinion Report (Form PCT/ISA/237) conducted in Int'l Application No. PCT/EP2020/068540 (Sep. 23, 2020).

* cited by examiner 1
2
3
4
5
6
7
8
9
10
11
B
C

Fig. 4
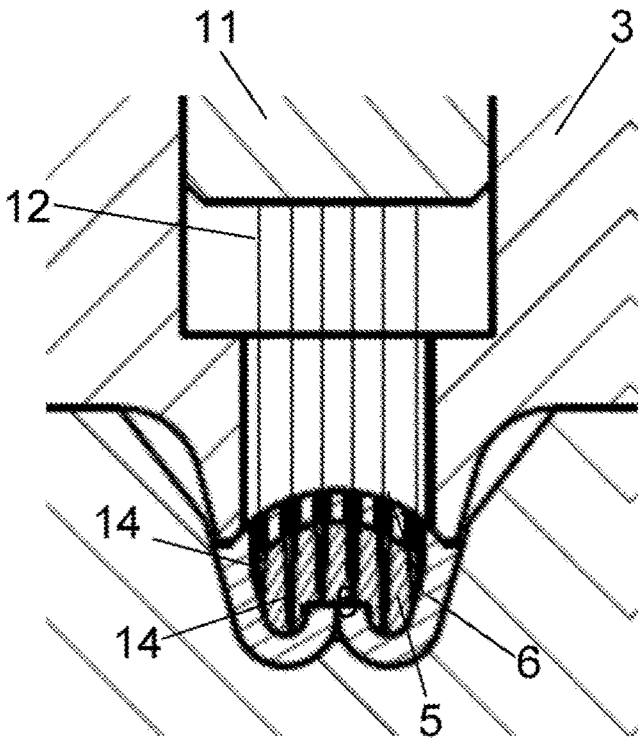
Fig. 5
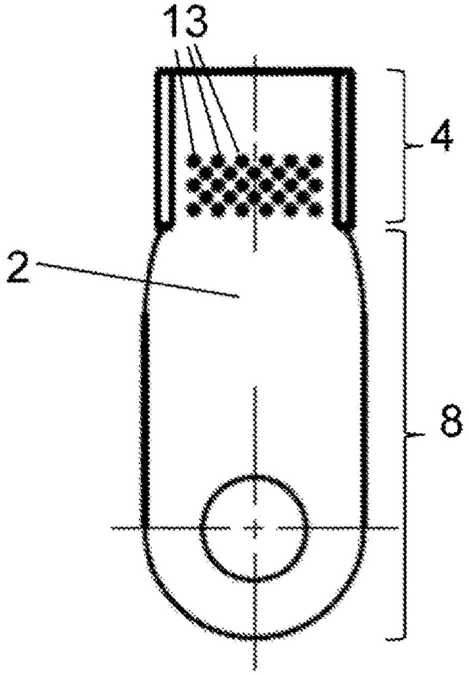
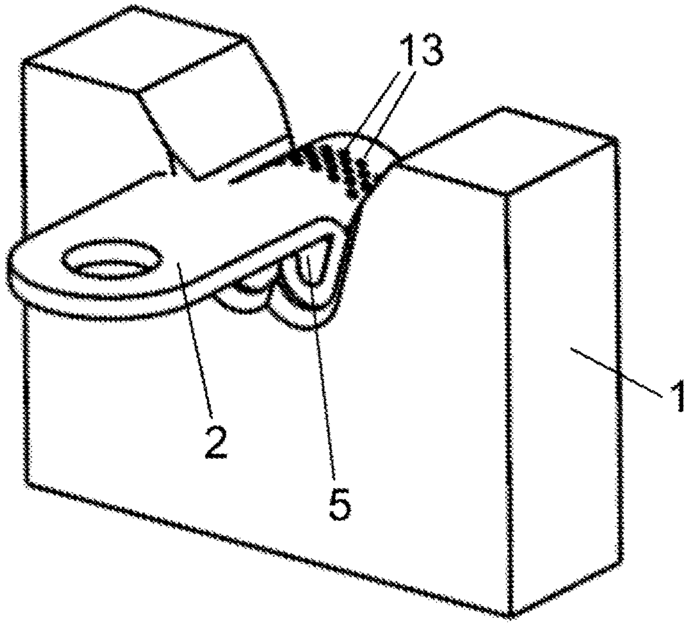
Fig. 6

Fig. 7d
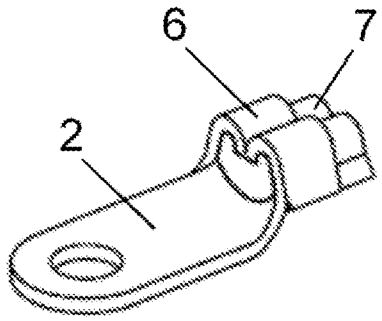
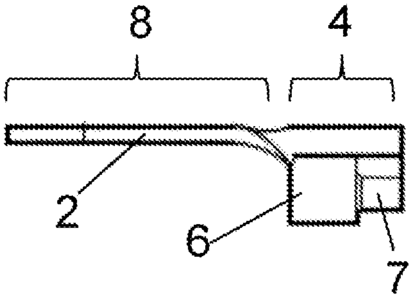
Fig. 7e
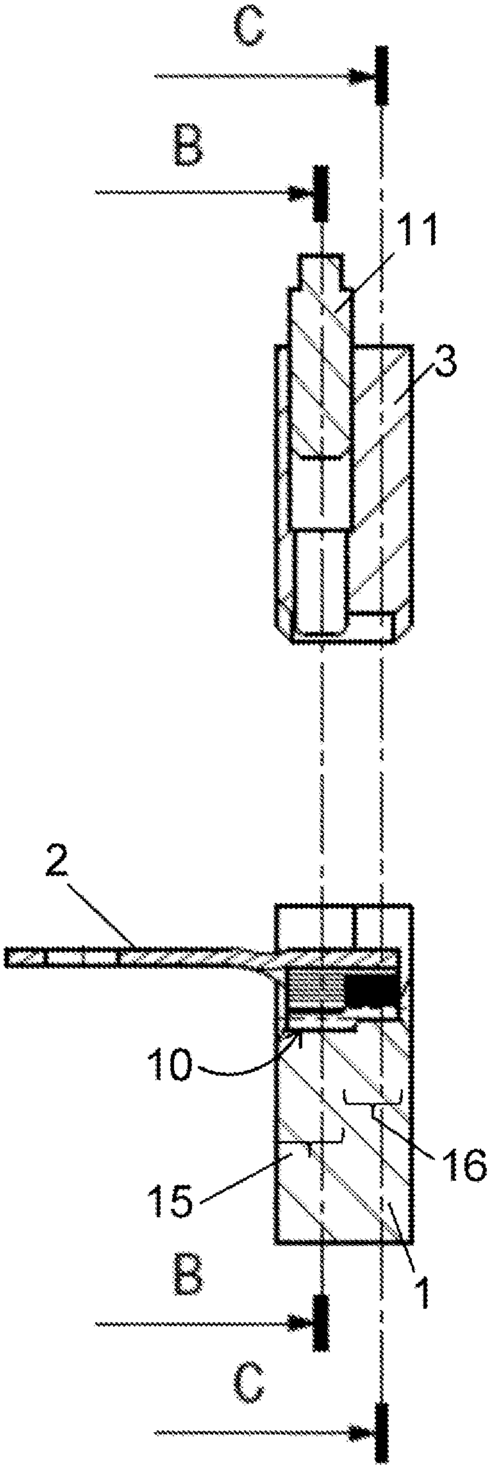
Fig. 7a

ELECTRICAL CONNECTION BETWEEN AN ELECTRICAL CONDUCTOR AND A CONTACT ELEMENT

FIELD OF THE INVENTION

The invention relates to a method for producing an electrical connection between an electrical conductor comprising a plurality of individual wires and a contact element wherein the electrical conductor is arranged in a contact portion of the contact element and subsequently the contact portion and the electrical conductor are pressed together so that the contact portion surrounds the electrical conductor.

The invention further relates to a corresponding device for producing an electrical connection and to a unit made of an electrical conductor comprising a plurality of individual wires and a contact element.

The contact element is formed, for example, by a cable lug, such as a crimp cable lug, or a cable sleeve, such as a crimp sleeve.

DESCRIPTION OF THE PRIOR ART

Connecting methods for electrically connecting an electric cable to a contact element are known, in which a cable crimping portion provided on the contact element is brought into press contact with an electrical conductor of the electric cable. In such a crimp contact connection, when the conductor of the electric cable is composed of a plurality of individual wires, the conductor wires located on the outer periphery are brought into direct contact with the contact element, and current conduction is easily obtained for them. The single wires which are arranged in the center of the conductor can be brought into conductive contact with the contact element only via the single wires which are located on the outer circumference.

In order to establish a corresponding transverse contact between the individual wires lying inside the conductor to other individual and further to the contact element, it was suggested in DE 10358153 A1, for example, that in addition to crimping, the individual wires be welded to each other and to the contact element by means of a laser. There, it is provided that several regions of the conductor are successively and overlapping. During the first welding step, rapid heating takes place due to the application of the laser beam and thereby an explosive distribution of material within the conductor. A subsequently welded region covers the first welded region and takes advantage of the elevated temperature condition that exists as a result, in that there is no rapid heating by the laser beam during the second and subsequent welding steps. The material melts gradually, so that explosive spreading can be prevented. However, the disadvantage of this method is that explosive distribution can still occur during the first welding step.

DE 10 2013 010981 B3 discloses a method and a device for connecting an electrical conductor to a contact part, wherein one or more openings are provided in the device for pressing through which a laser beam of a laser welding device can pass. A specific arrangement or mode of action of laser beams is not disclosed in DE 10 2013 010981 B3.

From US 2016/126642 A1, a crimped contact, element enclosing a bundle of aluminum wires is known. In a transition section where there are no aluminum wires, tabs of the contact element are connected to each other by means of spot laser welding, which, however, is intended to prevent liquid from entering the contact element and does not serve to establish on electrical connection between the individual wires of an electrical conductor and the contact element.

OBJECT OF THE INVENTION

It is therefore an object of the invention to overcome the disadvantages of the prior art and to propose a method in which the risk of explosive distribution can be reduced and yet cross-conductivity can be established between individual wires.

SUMMARY OF THE INVENTION

This object is solved by a method according to claim 1. The starting point for this is a method for producing an electrical connection between an electrical conductor comprising a plurality of individual wires and a contact element, wherein the electrical conductor is arranged in a contact portion of the contact element and subsequently the contact portion and the electrical conductor are pressed together so that the contact portion surrounds the electrical conductor.

According to the invention, it is provided that by means of laser irradiation of the contact portion, or by means of laser irradiation of the electrical conductor through an opening in the contact portion, a plurality of mutually spaced elongate welded connections are produced between the contact portion and the electrical conductor, wherein the elongate welded connections each extend in an irradiation direction from an irradiated region of the contact portion, or from an irradiated region of the electrical conductor, through an entire cross-section of the pressed electrical conductor to a region of the contact portion opposite to the irradiated region, so that the electrical conductor is connected to this region of the contact portion, wherein the irradiated regions are arranged in a grid pattern.

By forming a plurality of elongate welded connections each extending from the surface of the contact portion through the contact portion and further into the interior of the conductor, or by producing a plurality of elongate welded connections each extending from the surface of the electrical conductor into the interior of the conductor—in the event, an opening in the contact portion exposes the surface of the electrical conductor to laser irradiation, wherein the elongate welded connections are spaced apart from each other, the energy input is reduced compared to conventional welding methods because the material between the elongate welded connections is not to be melted according to the invention.

The deeper the elongate welded connections extend into the conductor, the more individual wires are connected to the elongate welded connection and the better the transverse conductivity. The Invention therefore provides that the laser irradiation is carried out in such a way that the elongate welded connections each extend in the irradiation direction through the entire cross-section of the pressed electrical conductor. Thus, in a first variant of the invention, the elongate welded connections extend in their longitudinal direction, where the laser radiation impinges on the contact element, from the irradiated region of the contact portion through the conductor to that region of the contact portion passing around the conductor which is opposite to the irradiated region. In this case, the individual wires covered by this welding connection are even connected to the contact portion at two points.

In a second variant of the invention, where the contact element has an opening through which the laser radiation passes and impinges on the surface of the electrical conductor, the elongate welded connections extend from the irradiated region of the electrical conductor through the conductor to that region of the contact portion which is guided around the conductor and which is opposite the irradiated region. In the case, the individual wires engaged by this welded connection are connected to the contact portion in at least one location.

By varying the energy introduced by the laser into the material and/or by varying the duration of the laser irradiation, it is possible to adjust how deeply the laser penetrates the material.

Elongate welded connections according to the present invention have a greater extension in their longitudinal direction, in the direction of irradiation, than in the width direction. Preferably, the length is a multiple of the average width or its diameter, and in particular the elongate welded connections may be rod-shaped, i.e. have an approximately constant diameter over their length.

Such elongate, in particular rod-shaped, welded connections can be produced by laser deep penetration welding, where a vapor capillary forms in the depth of the workpiece due to high beam intensities in the melt in the direction of radiation. The material is thereby also melted in depth, the melting zone is usually more deep than wide.

The energy of the laser beam is dosed according to the desired penetration depth of the laser beam into the region of the contact portion opposite to the irradiated region. The laser beam should not completely penetrate this opposite region of the contact portion and exit to the outside, as this would represent a quality defect.

A typical power of a laser for the method according to the invention is 1-15 kW, The power requirement depends on the material of the electrical conductor and the contact portion. The power requirement also depends on the diameter of the elongate welded connection, the length of the elongate welded connection, i.e. the penetration depth, and the penetration speed.

The irradiated region is visible after laser irradiation in the first variant of the invention at the surface of the contact portion, and in the second variant of the invention at the surface of the electrical conductor, generally as an approximately round area, corresponding to the diameter of the laser beam and the material of the contact portion or the electrical conductor melted all around. Thus, in the first variant of the invention, the irradiated regions are located on the surface of the contact portion, and in the second variant, they are located on the surface of the electrical conductor. Since the electrical conductor comprises a plurality of individual wires, the irradiated regions are thus located on the surface of the individual wires.

By concentrating the molten material per so-called laser penetration, i.e. per area of the subsequent elongate welded connection, to a very narrow area, only a small amount of material is liquefied relative to conventional welding methods, which reduces the risk of explosive spreading of material.

In one embodiment variant, the elongate welded connections are spaced apart from each other normal to the direction of irradiation over a majority of their length measured in the direction of irradiation, Ideally, the elongate welded connections are spaced apart from each other over their entire length.

According to one embodiment variant of the invention, a plurality of elongate welded connections, preferably all of them, are made in time succession by the same source of laser irradiation. With one source, i.e. a laser, all desired irradiated regions can be reached from one source, for example, by means of appropriate optical deflections (e.g. mirrors, etc.), without the contact element having to be moved relative to the source.

However, it is preferable, because it can be carried out more quickly, if several elongate welded connections are produced simultaneously, in particular by the same source of laser irradiation. With one source, for example, the laser beam can again be distributed to ail desired irradiated regions by appropriate optical deflections.

The invention provides that a plurality of elongate welded connections are made in a grid pattern, that is, in regularly spaced irradiated regions. The irradiated regions, usually visible as small, approximately circular spots on the surface of the contact region or the electrical conductor, are thus arranged at a distance from each other on the surface of the contact region or the electrical conductor. Due to the regular arrangement, a regular penetration of the conductor, and thus connection of the individual wires of the conductor, with elongate welded connections can be ensured. The irradiated regions are thus arranged according to a grid on the surface of the contact region or of the electrical conductor. The fact that the individual wires of the electrical conductor are usually additionally twisted and change their position in the conductor cross-section over their length also contributes to the contacting of all individual wires.

Examples of a grid-like arrangement of the irradiated regions are, for example, a plurality of irradiated regions which lie on a line and thus form a row, wherein two or more such rows are arranged transversely, in particular perpendicularly, to the longitudinal direction of the individual wires of the electrical conductor and are arranged at a constant distance from one another in the longitudinal direction of the individual wires. Adjacent rows have, for example, the same number of irradiated regions, or differ by one irradiated region.

In the grid-shaped arrangement of the irradiated regions, it can be provided that one irradiated region is offset from another irradiated region normal to the longitudinal direction of the individual wires, so that the projection of all the elongate welded connections onto a cross-sectional area of the electrical conductor which lies in the area of the elongate welded connections results in a continuous welded region in the transverse direction of the electrical conductor. This ensures that not only one and the same individual wire is always contacted by different elongate welded connections which follow one another in the longitudinal direction of the individual wires, but that other adjacent individual wires are not contacted. In addition, it is ensured that all individual wires are included at least once in an elongate welded connection.

The laser beam generally impinges on the contact portion normal to the surface of the contact portion in the first variant of the invention, or on the electrical conductor normal to the surface of the electrical conductor, specifically normal to the surface of its individual wires, in the second variant of the invention. In this respect, in this embodiment variant, the irradiated regions are simultaneously offset with respect to each other normal to the irradiation direction.

A possible grid-like arrangement with mutually offset irradiated regions comprises, for example, a plurality of rows of irradiated regions, wherein the rows extend transversely, in particular normally, to the longitudinal direction of the individual wires and adjacent rows are mutually offset transversely, in particular normally, to the longitudinal direction of the individual wires. The irradiated regions or the first, third, etc, rows can then be aligned with one another as seen in the longitudinal direction of the individual wires, as can the irradiated regions of the second, fourth, etc. row. Adjacent rows, which are offset from one another, can also overlap one another as seen in the longitudinal direction of the individual wires.

It may be provided that the degree of pressing of the individual wires is lower in a longitudinal region of the contact element where there are no irradiated regions than in a longitudinal region of the contact element where there, are irradiated regions.

The degree of pressing indicates the ratio of the conductor cross-section after pressing (or crimping) to the conductor cross-section before pressing (or crimping). A degree of pressing of 100% means that the conductor cross-section has not been reduced by pressing (or crimping), but has remained the same. A degree of pressing of 80% means that the conductor cross-section has been reduced to 80% of the original conductor cross-section by pressing (or crimping).

It may now be provided that the contact portion is divided into two longitudinal regions transversely to the longitudinal direction of the individual wires. In one longitudinal region, the conductor is only pressed, and in the other longitudinal region, the conductor is pressed and additionally irradiated with the laser according to the invention. In the longitudinal region where the laser is additionally irradiated, it is advantageous if there are as many interstices as possible between the individual wires, i.e. an open rope structure is ensured which acts as a venting channel when a melt pressure builds up during the laser welding process. This measure stabilizes the laser welding process, which means, for example, that if there is an emulsion residue between the pressed wires, this emulsion can evaporate when the energy is applied, which has a negative effect on the laser welding result. If one now ensures that a kind of chimney effect is given by the loose wire structure, die evaporation of this emulsion residue has no negative influence on the result.

One way of producing a different degree of pressing is to produce the different degree of pressing by means of a pressing tool with a stepped contact surface. The length of each of the two steps corresponds to a longitudinal section of the contact portion. The different height of the contact surface relative to the contact portion of the contact element causes the conductor to be compressed to different degrees in the two longitudinal sections of the contact element.

Another possibility for producing a different degree of pressing is that the different degree of pressing is produced by a contact portion with cable lug claws of different lengths in the transverse direction. The longitudinal portion that is to be compressed more then has longer cable lug claws, i.e. more material that is pressed towards the conductor during pressing. In this way, a different height or pressing of the conductor can be achieved even with a flat contact surface of the pressing tool.

It is also not excluded to use stepped contact surfaces and cable lug claws of different lengths at the same time.

With regard to an open rope structure of the individual wires, it is advantageous if the degree of pressing of the individual wires in a longitudinal region of the contact element where irradiated regions are located is greater than 70%.

In order to avoid unnecessary processing steps, such as moving the crimped conductor to a welding station, it can be provided that the laser irradiation takes place in the tool in which the pressing takes place.

In particular, it can be provided that the position of the pressed electrical conductor is not changed between pressing and laser irradiation. The pressed electrical conductor therefore remains in the tool after pressing and is also welded there with the laser.

It may be provided that the production of an elongate welded connection takes less than 100 ms, in particular less than 80 ms, for example around 60 ms. Depending on the power of the laser, a range of 20 to 100 ms results for the production of an elongate welded connection.

It can be provided that the contact portion is provided with a nickel coating at least in the area where it contacts the electrical conductor. On the one hand, the nickel coating provides corrosion protection between the conductor and the contact portion and, on the other hand, increases the energy absorption during laser welding.

In one embodiment of the invention, it is provided that the diameter of an irradiated region is between 0.4 and 0.8 mm, in particular between 0.5 and 0.7 mm, preferably 0.6 mm.

In one embodiment of the invention, it is provided that the grid constant of the irradiated regions is between 0.8 and 1.2 mm; in particular between 0.9 and 1.1 mm, preferably 1 mm. The grid constant determines the constant distance between two irradiated regions in a certain direction of the grid. Therefore, the grid constant will be larger than a diameter of an irradiated region so that the elongate welded connections are spaced apart from each other. The larger the grid constant compared to the diameter of the irradiated regions, the larger the distance between the elongated welds.

The diameter of an elongate welded connection is usually slightly larger than the diameter of the irradiated region. In particular, it may be provided that the largest diameter of an elongate welded connection is 0.7 to 0.9 mm, in particular around 0.8 mm.

A device for carrying out the method according to the invention, i.e. for producing an electrical connection between an electrical conductor comprising a plurality of individual wires and a contact element, comprises a pressing tool with which the electrical conductor arranged in a contact portion of the contact element can be crimped with the contact element so that the contact portion surrounds the electrical conductor, and is characterized in that a device for laser irradiation is provided, which is designed to produce a plurality of spaced-apart elongate welded connections between the contact portion and the electrical conductor, wherein the elongate welded connections each extend in an irradiation direction from an irradiated region of the contact portion, or from an irradiated region of the electrical conductor in an opening in the contact portion, to a region of the contact portion opposite the irradiated region so that the electrical conductor is connected to that region of the contact portion, wherein the irradiated regions are arranged in a grid pattern.

The device can be designed in such a way that one or more embodiment variants of the method according to the invention can be carried out with it. In particular, the device may be designed such that the position of the crimped electrical conductor is not changed between pressing and laser irradiation.

The invention also comprises a unit made according to the method according to the invention or with the device according to the invention, comprising an electrical conductor comprising a plurality of individual wires and a contact element, wherein the electrical conductor is arranged in a contact portion of the contact element and the contact portion and the electrical conductor are crimped together so that the contact portion surrounds the electrical conductor and an electrical connection exists between the electrical conductor and the contact element. The unit is characterized in that there are a plurality of spaced apart elongate welded connections between the contact portion and the electrical conductor, wherein the elongate welded connections each extend in an irradiation direction from an irradiated region of the contact portion, or from an irradiated region of the electrical conductor in an opening in the contact portion, to a region of the contact portion opposite the irradiated region so that the electrical conductor is connected to that region of the contact portion, wherein the irradiated regions are arranged in a grid pattern.

In accordance with one embodiment variant of the method according to the invention, the unit may be configured such that the elongate welded connections are spaced apart from each other along a major portion of their length normal to the direction of irradiation.

In accordance with one embodiment variant of the method according to the invention, the unit may be configured such that at least one irradiated region is offset from another irradiated region normal to the longitudinal direction of the individual wires, so that the projection of all elongate welded connections onto a cross-sectional area of the electrical conductor located in the region of the elongate welded connections results in a continuous welded region in the transverse direction of the electrical conductor.

According to one embodiment variant of the method according to the invention, the unit may be configured such that the diameter of an irradiated region is between 0.4 and 0.8 mm, in particular between 0.5 and 0.7 mm, preferably 0.6 mm.

In accordance with one embodiment variant of the method according to the invention, the unit may be designed such that the grid constant of the irradiated regions is between 0.8 and 1.2 mm, in particular between 0.9 and 1.1 mm, preferably 1 mm.

According to one embodiment variant of the method according to the invention, the unit may be configured such that the largest diameter of an elongate welded connection is 0.7 to 0.9 mm, in particular around 0.8 mm.

The invention can be used to make a so-called B crimp form or heart crimp form, as known from the prior art. The invention can of course also be used for other types of crimp form or press form.

In particular, the invention makes it possible to use single wires made of aluminum or an aluminum alloy. The use of aluminum for the individual wires leads, as is known, to the formation of an oxide layer on the surface of the individual wires and thus to the absence of stable resistance conditions over the service life of the conductor. However, the elongate welded connections according to the invention produce a material connection and thus an electrical contact between the individual wires and the contact portion of the contact element, which contact does not oxidize and therefore guarantees constant resistance conditions.

In an advantageous manner, the individual wires made of aluminum or an aluminum alloy are pressed with a contact portion or a contact element (e.g. crimp cable lug, crimp sleeve) made of copper or a copper alloy, e.g. bronze, brass.

The unit according to the invention can be used for high voltage connector systems.

BRIEF DESCRIPTION OF THE FIGURES

The invention will now be explained in more detail with reference to exemplary embodiments. The drawings are exemplary and are intended to illustrate the idea of the invention, but in no way to restrict it or even to reproduce it conclusively.

The figures show as follows:

FIG. 4 shows an enlargement from FIG. 3*b,*

FIG. 5 shows a top view of the contact element after laser welding,

FIG. 6 shows the contact element, after laser welding in a device according to FIGS. 1*a-c,*

FIGS. 7*a-e* show a second embodiment variant of a device for pressing and laser welding, wherein the pressing tool has a stepped contact surface.

DETAILED DESCRIPTION OF THE PREFERRED EMBODIMENTS

FIGS. 1*a-d* show a first embodiment variant of a device for pressing and laser welding, wherein this device is designed for contact elements having contact portions with cable lug claws of different lengths in the transverse direction.

Figures 1A, 1B, 1C, 1D:
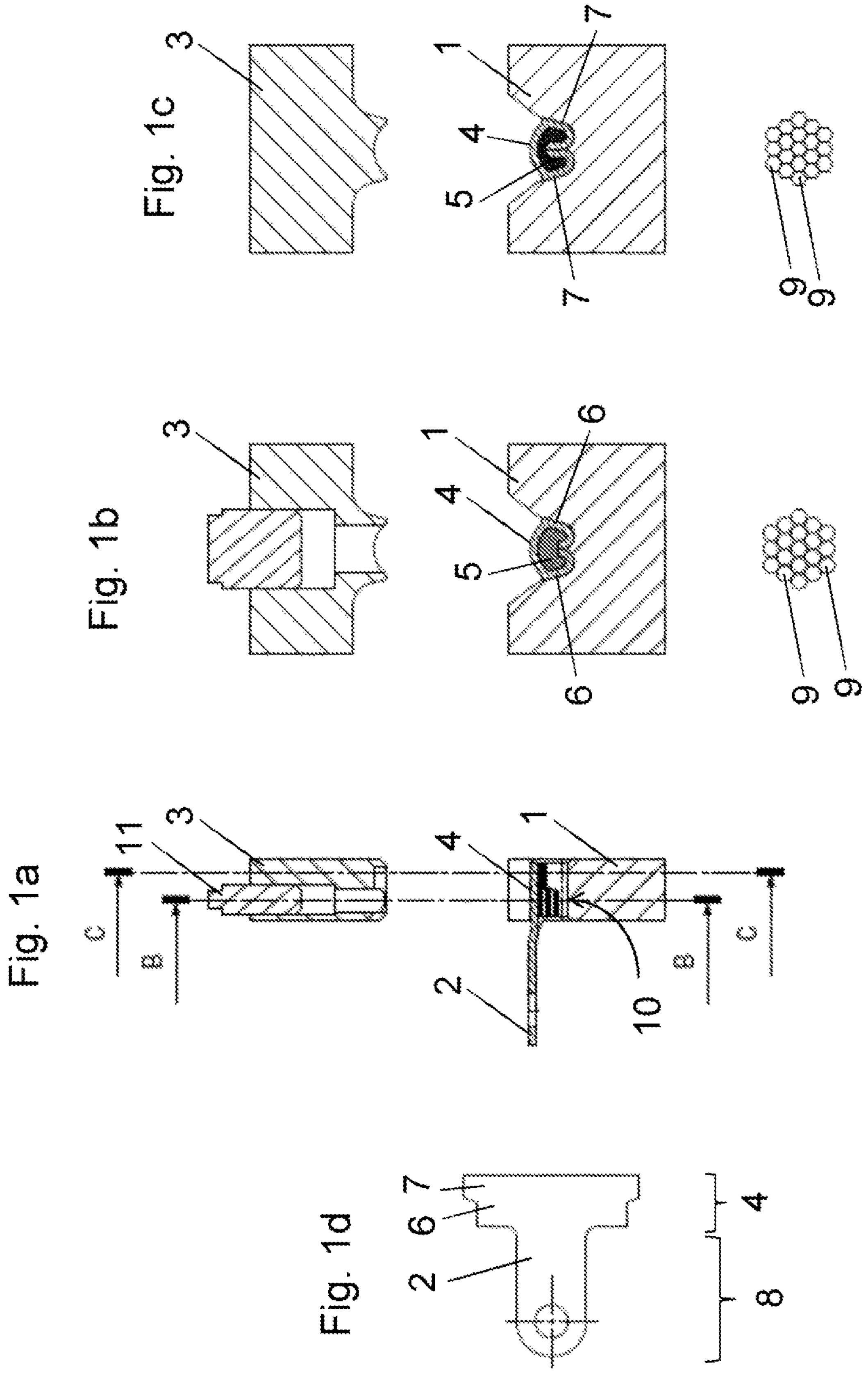
FIGS. 1*a-d* show a first embodiment variant of a device for pressing and laser welding (FIGS. 1*a-c*), fora contact, element (FIG. 1*d*) having contact portions with cable lug claws of different lengths in the transverse direction.

FIG. 1*a* shows a longitudinal section through the opened device. A contact element 2 (cable lug) is inserted into a lower part 1 of the pressing tool. By lowering the upper part 3 of the pressing tool, the contact portion 4 of the contact element 2, which contact portion 4 surrounds the electrical conductor 5, is pressed downwards, wherein the ends of the cable lug claws 6, 7 are pressed inwards into the conductor 5. In this way, the press or crimp connection is made in the form of a B-crimp.

In FIG. 1*d* the contact element 2 is shown in the state before crimping. Seen in its longitudinal direction, the contact element 2 here has a connection portion 8 with a round lug for further electrical connection and a contact portion 4 for pressing with the electrical conductor 5. The contact portion 4 is divided into two longitudinal sections with cable lug claws 6, 7 of different lengths in the transverse direction. The shorter cable lug claw 6 then surrounds an area of the conductor 5 which is closer to the connection portion 8 and which is additionally laser welded. Within the cable lug claw 6, therefore, a higher degree of compression results, for example higher than 70%, in particular higher than 80% or higher than 90%. Here, therefore, an open rope structure of the individual wires 9 of the conductor 5 is to be ensured. This can be seen in FIG. 1*b*, which shows a cross-section along line B-B in FIG. 1*a*. The individual wires 9 of the conductor 5 are shown below at this point, which still have a circular cross-section.

The longer cable lug claw 7 surrounds an area of the conductor 5 which is further away from the connection portion 8 and which is not laser welded. Within the cable lug claw 7, therefore, a lower degree or pressing is obtained, for example less than 80%. Here there are fewer intermediate spaces between the individual wires 9. This can be seen in FIG. 1*c*, which shows a cross-section along line C-C in FIG. 1*a*. Below, it can be seen that the individual wires 9 are pressed together to such an extent that they already have a rather hexagonal cross-section.

The contact surface 10 (see FIG. 1*a*) of the lower part 1 is straight here and therefore of the same design for both cable lug claws 6, 7. A laser part 11 is recessed in the upper part 3 so that it can be lowered.

Figure 2:
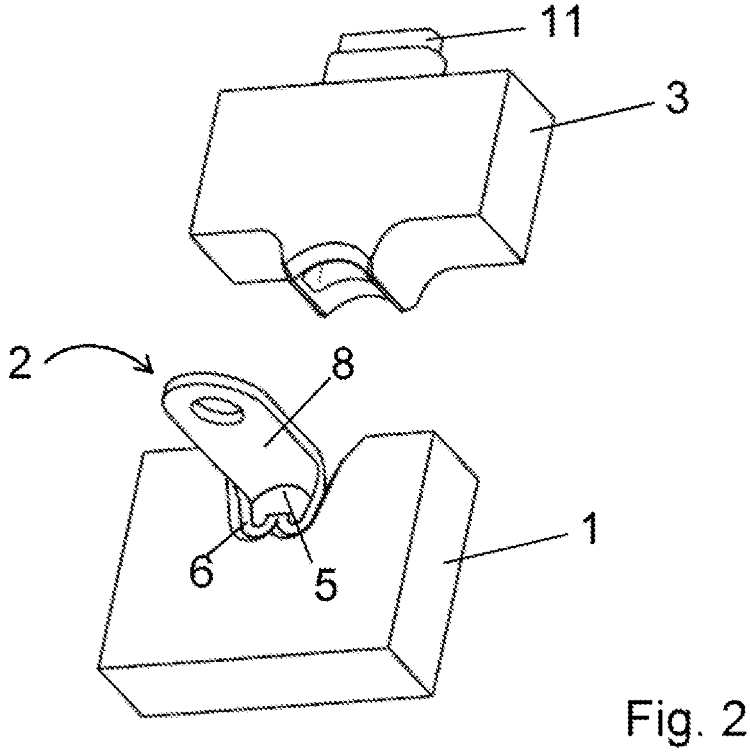
FIG. 2 shows a perspective view of the device of FIGS. 1*a-c,*

FIG. 2 shows a perspective view of the device of FIGS. 1*a-c*, with the conductor 5 pressed but not yet welded.

Figure 3A:
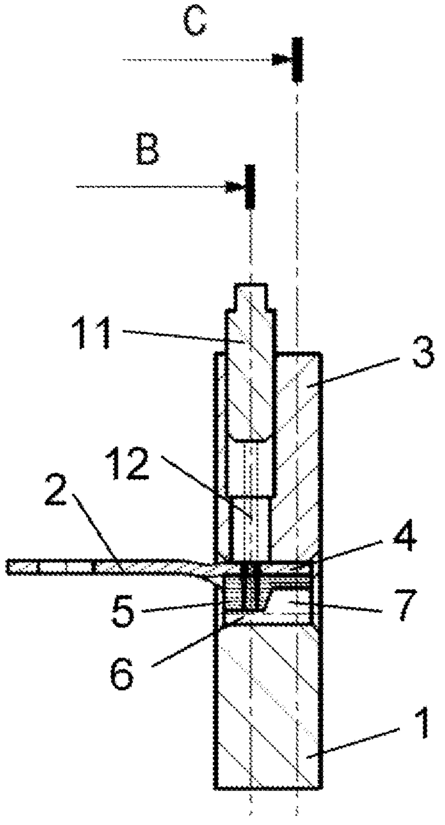
FIGS. 3*a-b* show the device from FIGS. 1*a-c* in sectional view during laser welding.
Figure 3B:
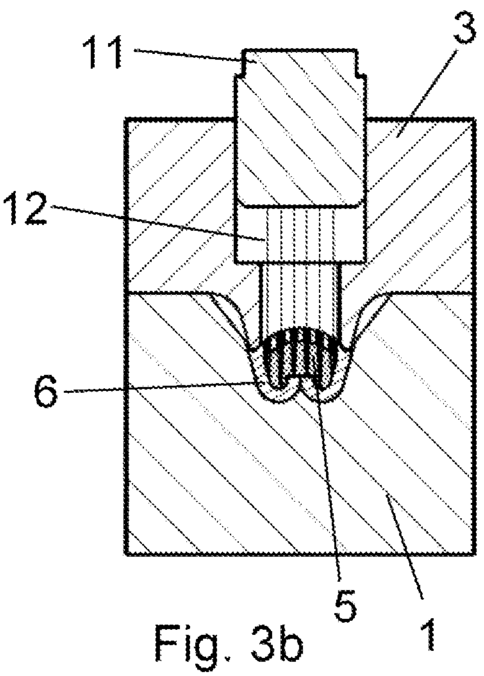

FIGS. 3*a-b* show the device of FIGS. 1*a-c* in sectional view during laser welding, corresponding to the illustrations in FIGS. 1*a* and *b*. The laser part 11 includes or is connected to a laser as a source of radiation. By means of optics including lenses, mirrors, etc., the laser part can emit a laser beam in the direction of irradiation, in this case the vertical, and shift this laser beam horizontally along a grid while maintaining the vertical orientation of the laser beam. In this way, the laser beam can be directed successively in time to different, approximately point-shaped, irradiated regions. The laser beams 12 are shown here as thin lines. Alternatively, an optical system may be used to split the laser beam into a plurality of laser beams 12 which impinge simultaneously on the irradiated regions.

In FIG. 3*a*, two laser beams 12 are shown, each of which impinges on an irradiated region and there forms an elongate welded connection 14 in each case downwards into the conductor 5 and up to the cable lug claw 6 on the opposite side. In FIG. 3*b*, six laser beams 12 are shown accordingly, each of which impinges in an irradiated region and forms an elongate welded connection 14 there in each case downwardly into the conductor 5 and as far as the cable lug claw 6 on the opposite side. The elongate welded connections 14 extend substantially in the direction of irradiation, that is to say here vertically. They do not overlap or touch each other.

FIG. 4 shows an enlargement from FIG. 3*b*, where the elongate welded connections 14 are shown schematically and can be seen more clearly.

FIG. 5 shows a top view of the contact element 2 after laser welding, where the entry points of the laser beam 12 are each recognizable as an irradiated region 13. The irradiated regions 13 are regularly spaced from one another and form here a grid with rows of alternately six and five irradiated regions 13 extending in the transverse direction of the contact element 2, i.e. normal to the longitudinal direction of the individual wires 9 of the electrical conductor 5. Rows following successively in the longitudinal direction of the individual wires 9 or in the longitudinal direction of the contact element 2 are offset relative to one another in the transverse direction by half a grid constant.

FIG. 6 shows the contact element 2 after laser welding in the lower part 1 of the pressing tool, wherein the irradiated regions 13 on the surface of the contact, element 2 are visible here.

Figure 7B:
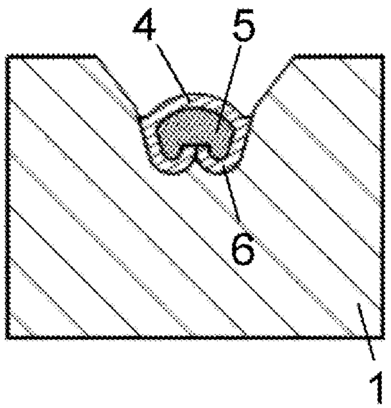

FIGS. 7*a-e* show a second embodiment variant of a device for pressing and laser welding, wherein the pressing tool has a stepped contact surface. FIG. 7*a* largely corresponds to FIG. 1*a* except for the fact that the contact surface 10 of the lower part 1 for the contact portion 4 here has a different height corresponding to the two longitudinal regions of the contact portion 4, thus forming two steps 15, 16. The cable lug claws 6, 7 may, but need not, be of the same length.

FIGS. 7*d* and 7*e* show the contact element 2 in the pressed state.

Figure 7C:
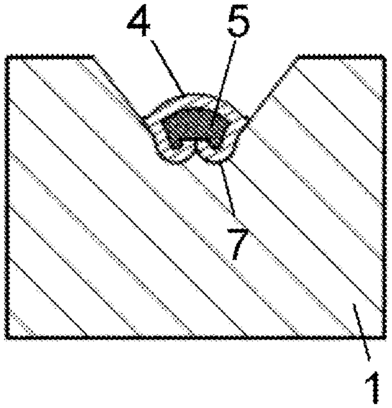
Figure 8:
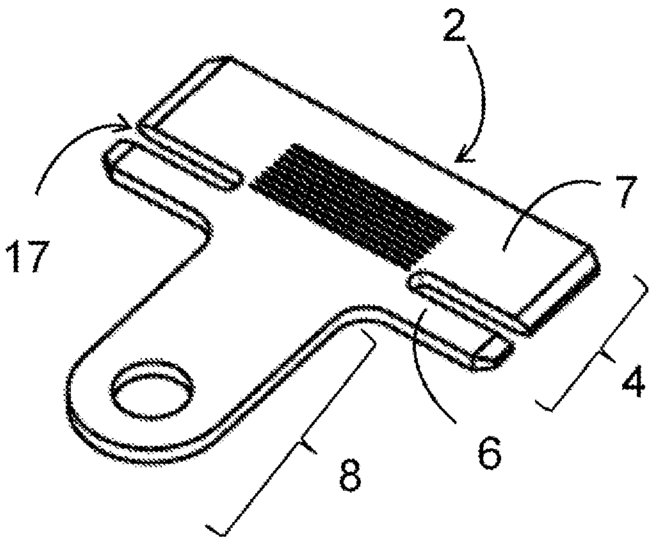
FIG. 8 shows a contact element in the initial state, for a device for pressing and laser welding in a third embodiment variant.

FIG. 7*b* corresponds to FIG. 1*b* and has the same degree of pressing, FIG. 7*c* corresponds to FIG. 1*c* and has the same degree of pressing.

The cable lug claw 6 surrounds an area of the conductor 5 which is closer to the connection portion 8 and which is additionally welded with the laser. Within the cable lug claw 6, a higher degree of pressing results, for example higher than 70%, in particular higher than 80% or higher than 90%, due to the step 15 being located further down. Here again an open rope structure of the individual wires 9 of the conductor 5 is ensured, the individual wires 9 still have a circular cross-section as in FIG. 1*b*.

The cable lug claw 7 again surrounds an area of the conductor 5 which is further away from the connection portion 8 and which is not welded with the laser. Within the cable lug claw 7, therefore, a lower degree of pressing results, for example less than 80%. Here there are fewer intermediate spaces between the individual wires 9, the same as in FIG. 1*c* below, where the individual wires 9 are pressed together to such an extent that they already have a rather hexagonal cross-section.

Following the pressing, laser welding takes place in the device according to FIGS. 7*a-c* as in FIGS. 3*a-b* and 4, with the same result as in FIGS. 5 and 6.

FIGS. 8-15 show a third embodiment variant of the invention, wherein the pressing tool here does not have a stepped contact surface. The two cable lug claws 6, 7 of the contact element 2 are here of equal length.

The contact element 2 in FIG. 8 again has a contact portion 4 and a connection portion 8. The contact portion 4 comprises on both sides two cable lug claws 6, 7, here of equal length, which are separated from each other by a slot which, in the pressed state of the contact element, forms an opening 17 through which the surface of the pressed electrical conductor 5 remains accessible. A corrugation between the two cable lug claws 7, which are further away from the end of the electrical conductor 5 than the cable lug claws 6, serves to secure the electrical conductor 5 against being pulled out of the contact element 2 in the longitudinal direction of the electrical conductor 5. The cable lug claws 6, 7 could also be of different lengths according to the embodiment variants in FIGS. 1 to 7.

Figure 9:
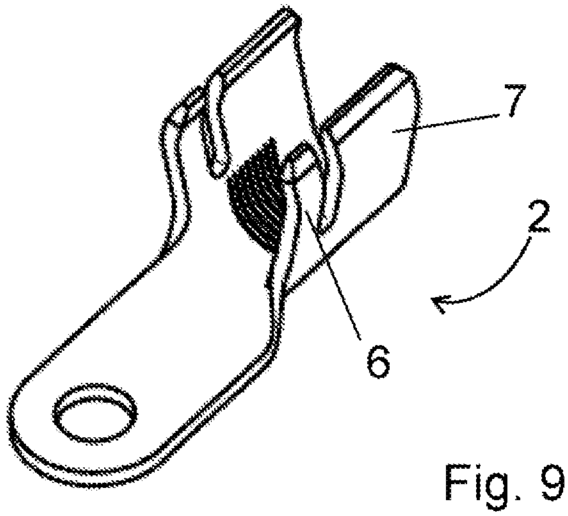
FIG. 9 shows the contact element of FIG. 8, bent to receive the electrical conductor.
Figure 10:
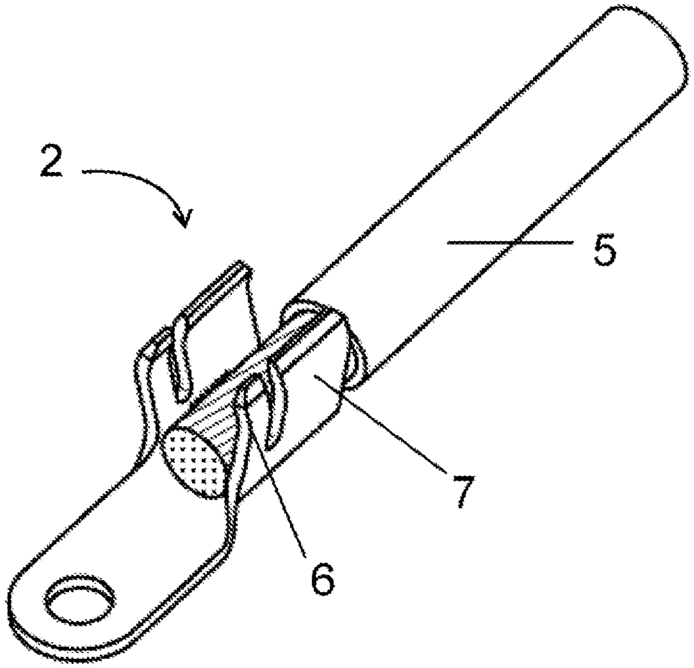
FIG. 10 shows the contact, element of FIG. 9 with electrical conductor.

In FIG. 9, the cable lug claws 6, 7 are already bent towards each other so that an electrical conductor 5 can be inserted between them, as shown in FIG. 10. The insulation of the electrical conductor 5 is removed in the area of the cable lug claws 6, 7. Unlike the embodiment variants of FIGS. 1-7, here the cable lug claws 6, 7 are bent upwardly relative to the connection portion 8. The ends of the cable lug claws 6, 7 are then pressed into the electrical conductor 5 from above during crimping, see FIGS. 11-13. In embodiment variants 1-7, the cable lug claws 6, 7 are pressed into the electrical conductor 5 from below.

Figure 11:
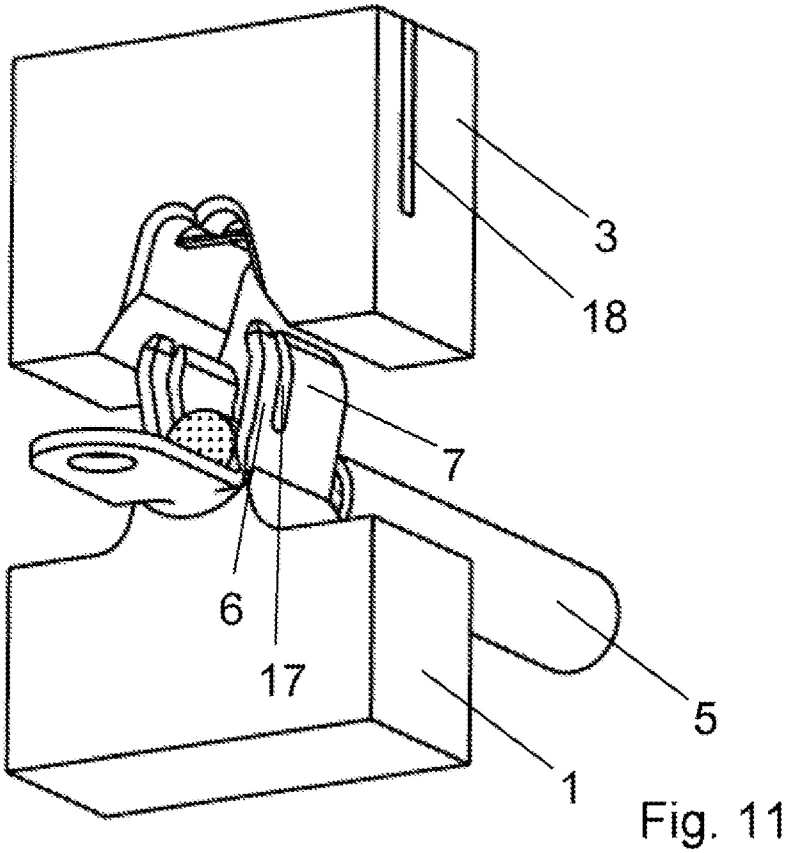
FIG. 11 shows the contact element of FIG. 10, inserted in a device for pressing and laser welding in a third embodiment variant, viewed obliquely from below.
Figure 12:
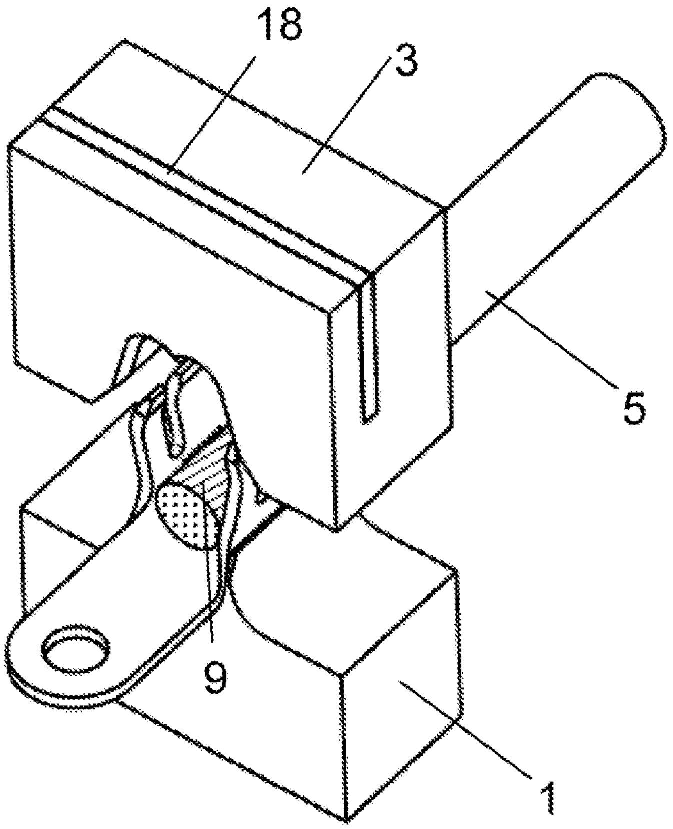
FIG. 12 shows the contact element, end the device of FIG. 11, seen from above at an angle.

In FIGS. 11 and 12, electrical conductor 5 and contact element 2 are inserted into the lower part 1 of a pressing tool. By lowering the upper part 3 of the pressing tool, see FIG. 13, the contact portion 4 of the contact element 2, more precisely its cable lug claws 6, 1, is pressed inwards and then downwards, wherein the ends of the cable lug claws 6, 7 are pressed inwards into the conductor 5. In this way, the press or crimp connection is made in the form of a B-crimp.

The upper part 3 has a recess 18 extending transversely to the longitudinal direction of the electrical conductor 5, which recess is aligned with the slot which later forms the opening 17 of the contact portion 4, so that laser beams 12 can be sent onto the surface of the electrical conductor 5 from above through this recess 18 and the opening 17. In this embodiment variant of the invention, the laser beams 12 thus strike the contact element 2 from the side with the ends of the cable lug claws 6, 7, whereas in the embodiment variants according to FIGS. 1-7 the laser beams 12 strike the opposite side of the contact element 2.

Figure 13:
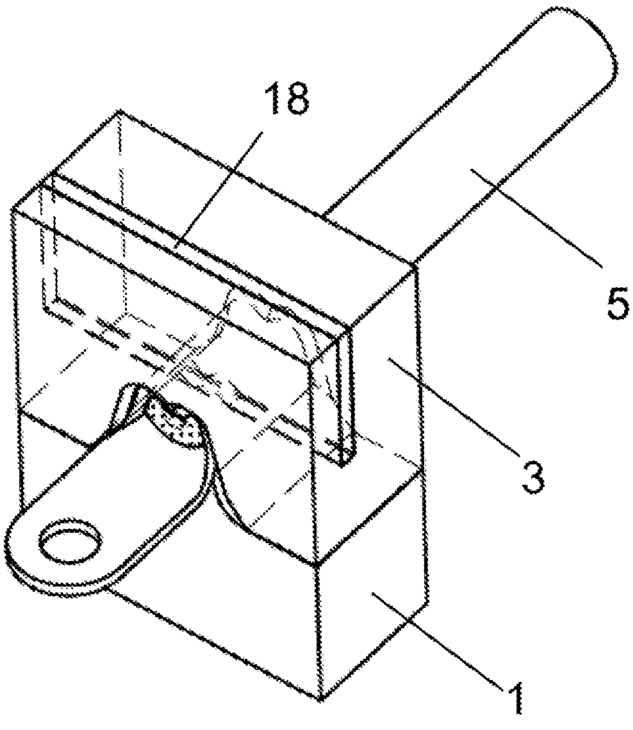
FIG. 13 shows the device from FIG. 11 in the dosed state.

In FIG. 13, the pressed electrical conductor 5 is shown in the closed pressing tool comprising the upper part 3 and the lower part 1.

Figure 14:
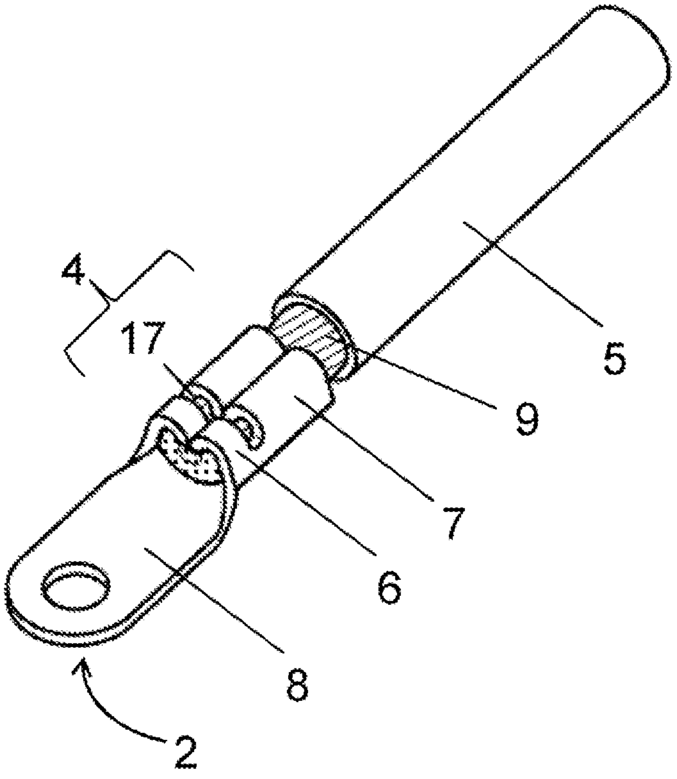
FIG. 14 shows the contact element of FIG. 10 crimped around the electrical conductor.

FIG. 14 shows the pressed electrical conductor 5 with pressed contact element 2 without pressing tool. With respect to the contact portion 4, seen in the longitudinal direction of the individual wires 9, the opening 17 is closer to the connection portion 8 than to the end of the contact portion 4 facing away from the connection portion 8. The opening 17 extends in the transverse direction of the contact element 4, i.e. normal to the longitudinal direction of the individual wires 9, over the entire width of the pressed electrical conductor 5. This ensures that each individual wire 9 is covered by an elongate welded connection 14.

Figure 15:
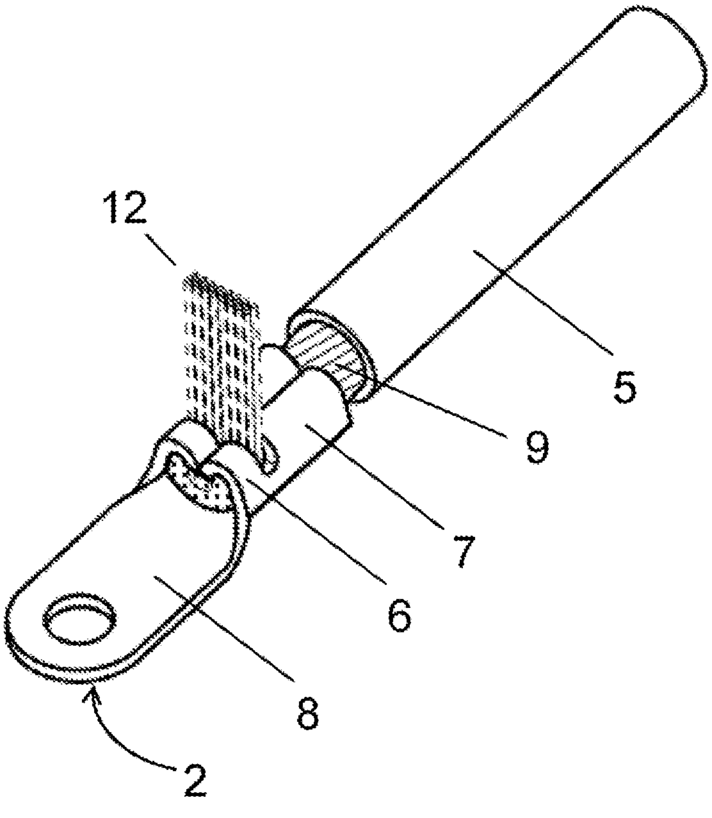
FIG. 15 shows the crimped contact element from FIG. 14 with laser irradiation.

FIG. 15 shows the process of laser irradiation on the crimped electrical conductor 5 of FIG. 14. This process takes place in the pressing tool 1, 3, following the pressing of the electrical conductor 5, the position of which does not change. The laser beams 12 are arranged in a grid pattern and impinge normally on the surface of the individual wires 9 exposed in the opening 17. The grid-shaped arrangement of the laser beams 12 here comprises three parallel rows which extend normally to the longitudinal direction of the individual wires 9, wherein the middle row is offset from the two outer rows by half a grid constant. The outer rows here comprise, for example, eight laser beams, and the middle row comprises seven laser beams.

Accordingly, three rows of eight or seven irradiated regions 13 are formed in the opening 17 on the surface of the individual wires 9.

Figure 16:
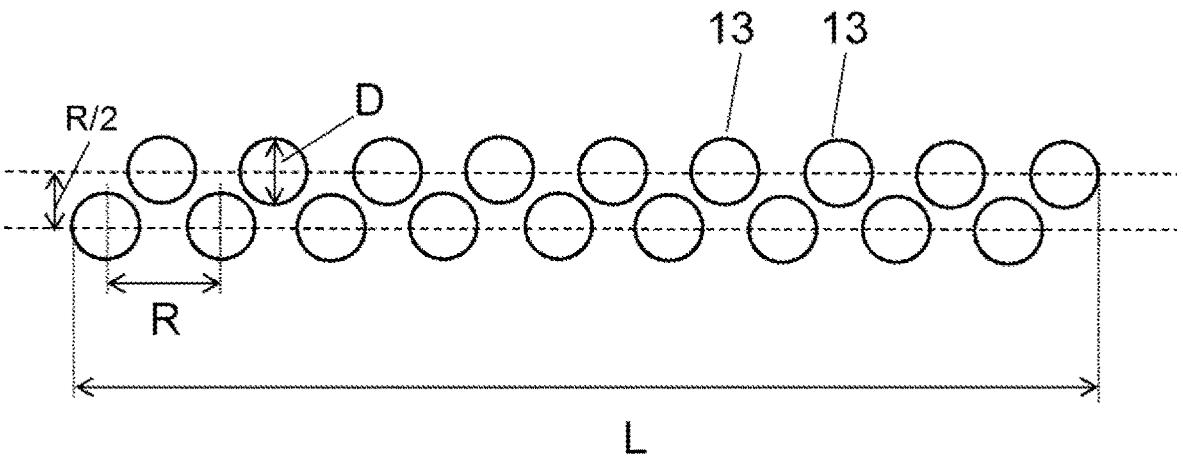
FIG. 16 shows a possible arrangement of irradiated regions.

FIG. 16 shows a possible arrangement of irradiated regions 13 in a larger schematic representation. The irradiated regions 13 are arranged here in two rows of nine irradiated regions 13 each, which rows together cover a length L corresponding to the width of the pressed electrical conductor 5. The rows extend normally to the longitudinal direction of the individual wires 9. Within a row, the irradiated regions 13 have a spacing from one another which corresponds to the grid constant R. Between adjacent rows, the distance is half the grid constant R. Due to the diameter D of an irradiated region 13 which is greater than half the grid constant R, there is thus an overlap of the irradiated regions 13 of adjacent rows, i.e. an overlap in the longitudinal direction of the individual wires 9.

It is essential, however, that the projection of all the elongate welded connections 14 extending downwardly into the drawing plane from the irradiated regions 13 in FIG. 16 onto a plane extending normally to the drawing plane and parallel to the rows of irradiated regions 13 covers the entire cross-section of the pressed electrical conductor 5. This ensures that ail individual wires 9 are covered by on elongate welded connection 14.

The irradiated regions 13 here have a diameter D of 0.6 mm, and the grid constant R is 1 mm.

LIST OF REFERENCE SIGNS

1 Lower part of the pressing tool
2 Contact element (cable lug)
3 Upper part of the pressing tool
4 Contact portion
5 Electrical conductor
6 Cable lug claw
7 Cable lug claw
8 Connection portion
9 Individual wire
10 Contact surface
11 Laser part (source of laser irradiation, device for laser irradiation)
12 Laser beam
13 Irradiated region
14 Elongate welded connection
15 Step
16 Step
17 Opening in contact element 2
18 Recess In the upper part 3
D Diameter
L Length
R Grid constant

The invention claimed is:

1. A method for producing an electrical connection between an electrical conductor comprising a plurality of individual wires and a contact element, wherein the electrical conductor is arranged in a contact portion of the contact element, and the contact portion and the electrical conductor are subsequently pressed together so that the contact portion surrounds the electrical conductor, wherein by laser irradiation of the contact portion, or by laser irradiation of the electrical conductor through an opening in the contact portion, a plurality of elongate welded connections spaced apart from one another are produced between the contact portion and the electrical conductor, wherein the elongate welded connections each extend in an irradiation direction from an irradiated region of the contact portion, or from an irradiated region of the electrical conductor, through an entire cross-section of the pressed electrical conductor to an area of the contact portion opposite to the irradiated region so that the electrical conductor is connected to this area of the contact portion, wherein the irradiated regions are arranged in a grid.

2. The method according to claim 1, wherein the elongate welded connections are spaced apart from each other for a majority of their length normal to the direction of irradiation.

3. The method according to claim 1, wherein a plurality of elongate welded connections are produced simultaneously, in particular by the same source of laser irradiation.

4. The method according to claim 1, wherein at least one irradiated region is offset with respect to another irradiated region normal to the longitudinal direction of the individual wires, so that the projection of all elongate welded connections onto a cross-sectional area of the electrical conductor located in the region of the elongate welded connections results in a continuous welded region in the transverse direction of the electrical conductor.

5. The method according to claim 1, wherein the degree of pressing of the individual wires is lower in a longitudinal region of the contact element where no irradiated regions are located than in a longitudinal region of the contact element where irradiated regions are located.

6. The method according to claim 5, wherein the different degree of pressing is produced by a pressing tool having a stepped contact surface.

7. The method according to claim 5, wherein the different degree of pressing is produced by a contact portion with cable lug claws of different lengths in the transverse direction.

8. The method according to claim 1, wherein the degree of pressing of the individual wires in a longitudinal region of the contact element where irradiated regions are located is greater than 70%.

9. The method according to claim 1, wherein the laser irradiation takes place in that tool in which the pressing takes place.

10. The method according to claim 9, wherein the position of the pressed electrical conductor is not changed between pressing and laser irradiation.

11. The method according to claim 1, wherein the production of an elongate welded connection takes less than 100 ms, in particular less than 80 ms, for example by 60 ms.

12. The method according to claim 1, wherein the diameter of an irradiated region is between 0.4 and 0.8 mm, in particular between 0.5 and 0.7 mm, preferably 0.6 mm.

13. The method according to claim 1, wherein the grid constant of the irradiated regions is between 0.8 and 1.2 mm, in particular between 0.9 and 1.1 mm, preferably 1 mm.

14. The method according to claim 1, wherein the largest diameter of an elongate welded connection is 0.7 to 0.9 mm, in particular by 0.8 mm.

15. A device for producing an electrical connection between an electrical conductor comprising a plurality of individual wires and a contact element, the device comprising a pressing tool with which the electrical conductor arranged in a contact portion of the contact element can be pressed with the contact element so that the contact portion surrounds the electrical conductor, wherein a device for laser irradiation is provided, which is designed to produce a plurality of elongate welded connections spaced apart from one another between the contact portion and the electrical conductor, wherein the elongate welded connections each extend in an irradiation direction from an irradiated region of the contact portion, or from an irradiated region of the electrical conductor in an opening in the contact portion, to a region of the contact portion opposite the irradiated region, so that the electrical conductor is connected to this region of the contact portion, wherein the irradiated regions are arranged in a grid pattern.

16. A unit with an electrical conductor comprising a plurality of individual wires and a contact element, wherein the electrical conductor is arranged in a contact portion of the contact element and the contact portion and the electrical conductor are pressed together so that the contact portion surrounds the electrical conductor and an electrical connection exists between the electrical conductor and the contact element, wherein a plurality of mutually spaced elongate welded connections are present between the contact portion and the electrical conductor, wherein the elongate welded connections each extend in an irradiation direction from an irradiated region of the contact portion, or from an irradiated region of the electrical conductor in an opening in the contact portion, to a region of the contact portion which is opposite the irradiated region, so that the electrical conductor is connected to this region of the contact portion, wherein the irradiated regions are arranged in a grid pattern.

17. The unit according to claim 16, wherein the elongate welded connections are spaced apart from each other for a majority of their length normal to the direction of irradiation.

18. The unit according to claim 16, wherein at least one irradiated region is offset from another irradiated region normal to the longitudinal direction of the individual wires, so that the projection of all elongate welded connections onto a cross-sectional area of the electrical conductor located in the region of the elongate welded connections results in a continuous welded region in the transverse direction of the electrical conductor.

19. The unit according to claim 16, wherein the diameter of an irradiated region is between 0.4 and 0.8 mm, in particular between 0.5 and 0.7 mm, preferably 0.6 mm.

20. The unit according to claim 16, wherein the grid constant of the irradiated regions is between 0.8 and 1.2 mm, in particular between 0.9 and 1.1 mm, preferably 1 mm.

21. The unit according to claim 16, wherein the largest diameter of an elongate welded connection is 0.7 to 0.9 mm, in particular around 0.8 mm.

* * * * *